No. 12,495.

REISSUED JUNE 12, 1906.

J. W. HENDERSON.

FOUNDRY OR CASTING PLANT.

APPLICATION FILED MAR. 7, 1906.

2 SHEETS—SHEET 1.

WITNESSES.

J. R. Kellar

Robert C. Totten

INVENTOR.

Joseph W. Henderson

By Kay Totten & White

Attorneys

No. 12,495. REISSUED JUNE 12, 1906.

J. W. HENDERSON.

FOUNDRY OR CASTING PLANT.

APPLICATION FILED MAR. 7, 1906.

2 SHEETS—SHEET 2.

WITNESSES.

J. R. Keller

Robert C. Potter

INVENTOR.

Joseph W. Henderson

By Kay Potter & Winter attorneys

UNITED STATES PATENT OFFICE.

JOSEPH W. HENDERSON, OF BUTLER, PENNSYLVANIA.

FOUNDRY OR CASTING PLANT.

No. 12,495. Specification of Reissued Letters Patent. Reissued June 12, 1906.

Original No. 783,200, dated February 21, 1905. Application for reissue filed March 7, 1906. Serial No. 304,303.

*To all whom it may concern:*

Be it known that I, JOSEPH W. HENDERSON, a citizen of the United States, residing at Butler, State of Pennsylvania, have invented certain new and useful Improvements in Foundry or Casting Plants, of which the following is a specification.

My invention relates to improvements in a foundry or casting plant which may be continuously operated.

One object of the invention is to provide a plant of this character which shall be so constructed that the manual labor employed, the equipment, and the floor area required may all be reduced to a minimum, thereby correspondingly decreasing the cost of operating.

This invention appertains more particularly to a foundry plant for molding and casting articles in large numbers from the same pattern.

This invention comprises simple means for conveying the molds and flasks in a foundry or molding and casting plant from and back to the molding-spaces or molding-machines, to the arrangement and construction of underground and overhead conveyers, to the flasks and completed molds to facilitate the operations, and to the construction of floors and a system of tracks in combination therewith.

Figure 1:
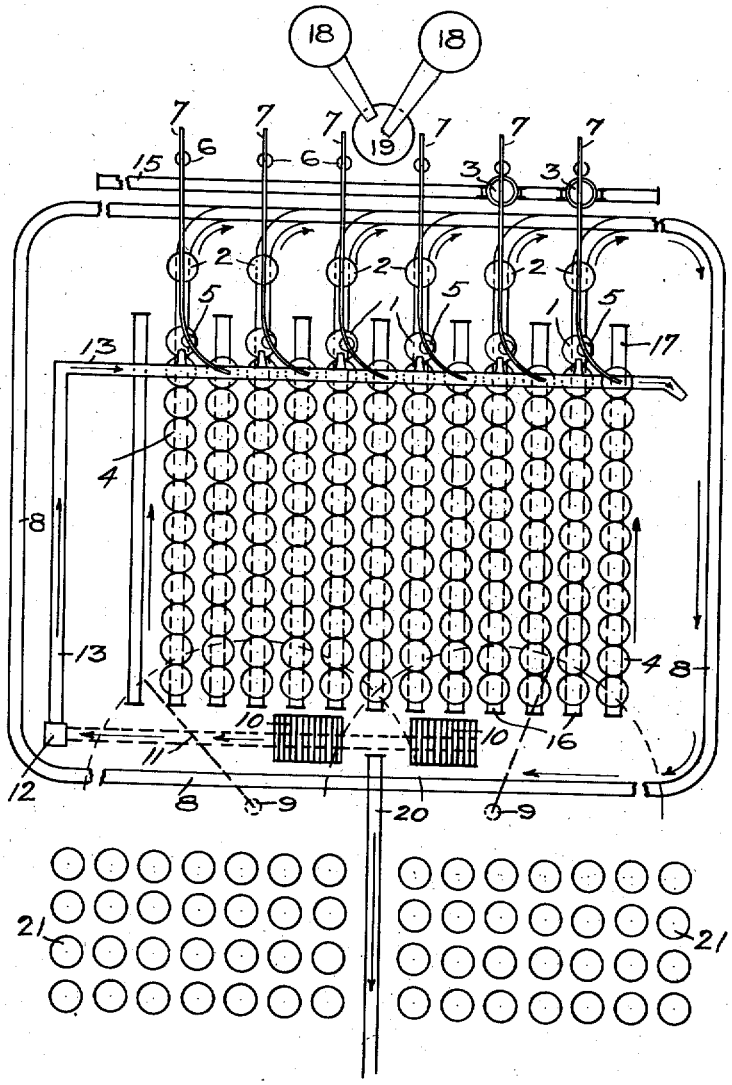
Figure 2:
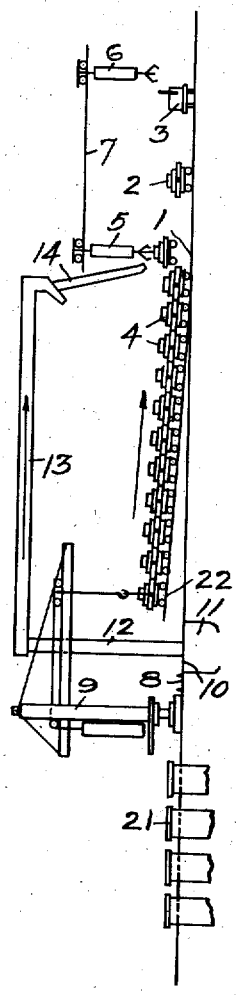
Figure 3:
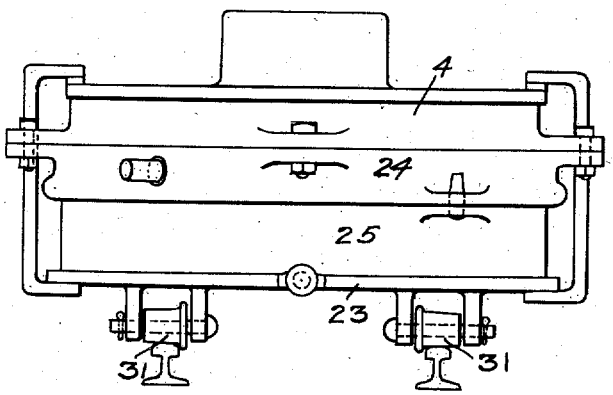
Figure 4:
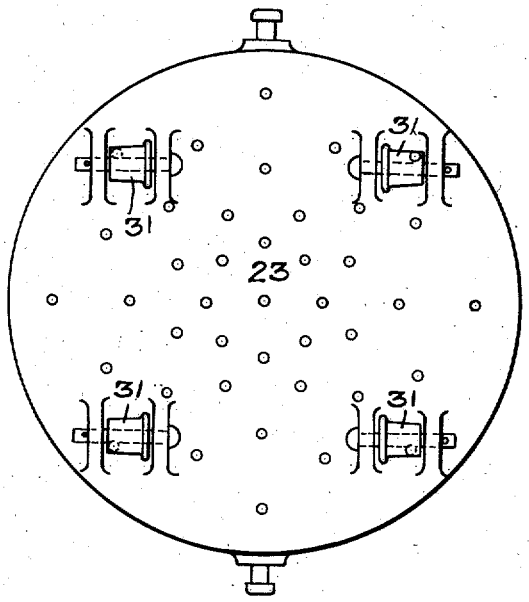

In the drawings, Figure 1 is a plan view of my improved foundry or molding and casting plant, showing the system of tracks. Fig. 2 is a side elevation thereof, showing the position of various parts and overhead sand-carrier and the sand-chutes for delivering the sand to the flasks or molds or molding-machines. Fig. 3 is an elevation of a complete car-wheel flask or mold, showing on its bottom part wheels or rollers to travel on a track. Fig. 4 is an inverted plan of the bottom of the flask or mold and having attached thereto a set of wheels or rollers.

In ordinary foundry practice car-wheel molds are formed in flasks under cranes and are set either in circles or on straight floors, and the pouring of the molten metal is usually not commenced until the total number of molds for the day's work on each floor (generally twenty) has been finished. After all the molds have been filled and a sufficient time for cooling has elapsed each mold is shaken out, whereby the resulting casting and the sand are separated from the flask. The wheels are then placed in pits, and the sand is afterward tempered and made ready for use the following day. These operations leave the empty flasks occupying relatively the same positions on the floor as at the beginning of the day's work and the sand in a heap on the floor and adjoining the flasks. This ordinary practice requires large area for floor-space, takes not less than two men for each floor, requires as many flasks as there are molds to be made each day, severally taxes the manual labor employed, and, finally, limits the production of a given-size foundry.

Referring to the drawings Figs. 1 and 2, the permanent or immovable parts of the system will first be described. The points 1 designate the "floor" or space where the molding-work is done. There may be any desired number of these molding-spaces, according to the size of the foundry. Parallel straight tracks 16 and 17 are arranged on the foundry-floor and extend in a direction between the pouring-ladles and cupolas 18 at one end of the foundry and the cranes 9 at the other end, where the casting and sand are separated from the flask. These parallel straight tracks incline downwardly toward the pouring-ladles or molding-spaces and are designed to carry empty flasks on wheels or rollers. There should be, of course, as many parallel tracks for empty flasks as the size and capacity of the foundry are intended for. The empty flasks will traverse these tracks in one direction only—to wit, from that end of the foundry where said cranes are toward the other end where the molding-work is done.

Extending around and encircling all the parallel straight tracks 16 and 17 is a transfer or frame-shaped track 8, which has four straight stretches at right angles to each other and curved corners uniting the said right-angled stretches. In outline or plan this track 8 is rectangular-shaped.

The cupolas 18 have troughs which deliver molten metal into a large ladle 19. A straight track 15 extends crosswise and parallel with one of the stretches of the endless track 8 and past the large ladle 19. Smaller ladles 3, mounted on wheels, traverse the said crosswise track 15 in order to have the small ladles take proper position under either of the overhead tracks or travelers 7, which latter extend from said crosswise track 15 directly over the tracks 16, and the inner ends of said overhead tracks 7 curved laterally and terminate over tracks 17. By this arrangement each of the overhead tracks 7 may carry the air-hoist 5 to a point where it may be connected to an end flask on either of the tracks 16 or 17 and transfer it bodily to one of the pouring-spaces 2. When the flask has been placed in proper position for the reception of the metal, the small ladles 3 are conveyed, by means of the overhead track 7, to a point just above said flask and the metal poured into said flask.

Adjacent that stretch of the endless or rectangular track 8 which passes the cranes 9 are sand-grates 10, which are flush with the floor. These grates are employed for separating the casting and sand, and said grates open into underground passages or conveyers 11, which carry the sand to an ordinary elevator located at 12. This elevator, of any desired construction, raises the sand from the underground conveyer 11 to the overhead conveyer 13. This latter conveyer has chutes 14, which lead down to the flasks at the respective floors or points 1, where the molder is at work. Annealing-pits 21 are provided, and a railway-track 20 leads to said pits. All the tracks 16 17 have an inclination downward, as shown at 22, toward the floors 1 or molding-spaces, so that the flasks will run by gravity. At the point 1, where the molder stands, the flasks receive the sand from the chutes 14, and the molds may be formed by manual labor or by machines or other devices. After the molds are formed at 1 the flasks are transferred by cranes or air-hoists 5 to the point 2 on any one of the parallel tracks 16, that are extended to near the transfer-track 8, and the copes or upper parts of the flasks are lifted by and suspended from cranes or air-hoists 6, while the patterns are being removed from the molds, the cores set, and the molds finished and made ready to be clamped together. The copes are then replaced by the said cranes or air-hoists 6 and the flasks or mold parts clamped together. The small ladles 3 may traverse the overhead tracks 7 and the molten metal or metals poured into the completed molds from said small ladles, which are transferred to and from the point 2. The small ladles 3 receive the molten metal or metals from the large ladle 19, which in turn receives the molten metal that comes from the cupolas 18.

As soon as practicable after pouring the molten metal into the molds at 2 the flasks 4 and their contents are moved on their rollers over the tracks 16, the transfer-track 8, and any suitable driving or pulling mechanism (not shown) may be employed to move said flasks on tracks 8 to the cranes 9. In the present instance two cranes 9 are shown; but there may be any number of these cranes and of any design. By aid of the cranes the casting and the sand are separated from the flasks, the sand falling through the grates 10, and the parts of the flasks are again clamped together or reassembled, as shown in Fig. 3, and by means of said cranes 9 again placed on the tracks 16 or 17, as the case may be, as shown at 22 in Fig. 2, so that the flasks will move in the direction of the arrows by gravity on the incline, as shown in Fig. 2, or by other means back to the molding-point 1 on track 16 or 17, thus completing the circuit. If the empty flasks are on track 17, they can be transferred from 17 by cranes or air-hoists 5, hanging from travelers on the overhead track 7, as hereinbefore described.

The car-wheels or other castings may be placed by cranes 9 onto cars or other suitable devices (not shown) to be located on track 20 and conveyed in the direction of the arrow to any suitable mechanism (not shown) which will place the said wheels in the annealing-pits 21. As soon as the patterns are removed from the molds at the point 2 they may be placed in other flasks at the point 1, which receive the sand from chutes 14, as already described. The sand is caused to fall through the grated floors at 10 and by means of underground conveyers at 11 carried to elevator 12, which will carry it to a point overhead, where it may be screened, watered, and tempered and returned by an overhead conveyer 13 (not shown) and carried by the latter in the direction of the arrows to the chutes 14, where it may again be discharged into the flasks as desired.

The complete car-wheel flask (see Fig. 3) may be of the design shown or any other design and have the wheels or rollers 31 on bottom board 23 and clamped to and in connection with chill-ring 24 between the cope 4 and the drag-ring 25, all being secured together by clamps.

Having thus fully described my invention, what I claim as new, and desire to secure by Letters Patent, is—

1. In a foundry or plant for the manufacture of castings the combination of the cupolas at one end of the foundry-building; a plurality of parallel floor-tracks extending in a direction toward said cupolas; a transfer-track, 8, which extends crosswise of the cupola ends of said parallel tracks then back to and crosswise of the opposite ends of said tracks; cranes at said opposite ends of said parallel tracks; tracks connecting the ends of the parallel tracks with said transfer-track; overhead tracks in alinement with said connecting-tracks and having travelers which move toward and away from said parallel tracks, and flasks mounted on rollers.

2. In a foundry or plant for the manufacture of castings the combination with the cupolas at one end of the foundry, of a plurality of parallel floor-tracks extending in a direction toward said cupolas; a transfer-track surrounding the parallel floor-tracks and passing the said cupolas; tracks connecting the ends of the parallel tracks with the transfer-track; a track, 15, interposed between the ends of said floor-tracks and the cupolas: a sand-grate at the opposite ends of said parallel floor-tracks and between the latter and the continuous transfer-track, and means for conveying the sand from said grates at one end of the floor-tracks to the opposite ends of said floor-tracks, for the purpose set forth.

3. In a foundry, the combination with flasks mounted on wheels or rollers, of a mold-forming and pouring space on the foundry-floor, a flask shaking-out space, a flask-storing track inclined downwardly from the shaking-out space toward the mold-forming and pouring space, a transfer-track leading from the pouring-space to the shaking-out space, and a crane arranged to transfer the flasks from the transfer-track to the shaking-out space and from thence to the higher end of said inclined track.

4. In a foundry, the combination with flasks mounted on wheels or rollers, of a mold-forming and pouring space at one end of the foundry, a flask-shaking-out space at the opposite end, a plurality of flask-storing tracks inclined downwardly from the shaking-out space toward the mold-forming and pouring space, a transfer-track leading from the pouring-space to the shaking-out space, and mechanism for transferring the flasks from the transfer-track to the shaking-out space and thence to the higher ends of said inclined tracks.

5. In a foundry, the combination with flasks mounted on wheels or rollers, of a mold-forming and pouring space, a flask-shaking-out space, a flask-storing track inclined downwardly from the shaking-out space to the mold-forming and pouring space, a transfer-track leading from the pouring-space to the shaking-out space, a crane for transferring the flasks from the transfer-track to the shaking-out space and thence to the higher end of said inclined track, and a conveyer for transferring the sand from the shaking-out space to the mold-forming space.

6. In a foundry, the combination with flasks mounted on wheels or rollers, of a pouring-space at one end of the foundry, a shaking-out space at the opposite end of the foundry, a plurality of flask-storing tracks inclined downwardly toward the pouring-space, sand-supply means above the lower ends of said tracks, means for transferring the filled flasks from the lower ends of the inclined tracks to the pouring-space, a transfer-track leading from the pouring-space to the shaking-out space, mechanism for transferring the flasks from said transfer-track to the shaking-out space and thence to the higher ends of said inclined tracks, and a conveyer for returning the sand from the shaking-out space to said sand-supply means.

In testimony whereof I have affixed my signature hereto in the presence of two witnesses.

JOSEPH W. HENDERSON.

Witnesses:
W. G. HEESEL,
A. GRONTOFT.